Feb. 25, 1969   R. M. WHITE   3,429,196
AUTOMOBILE SAFETY STEERING
Filed April 3, 1967
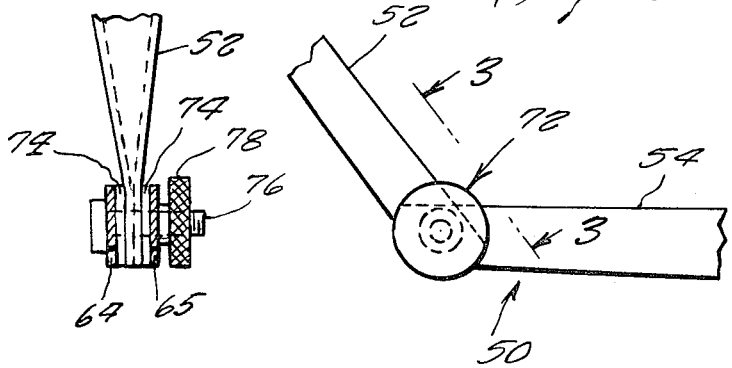
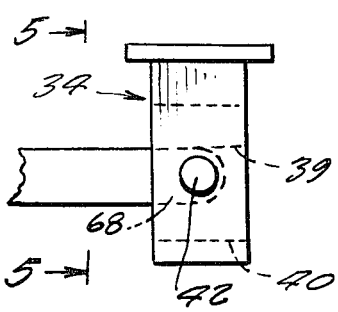
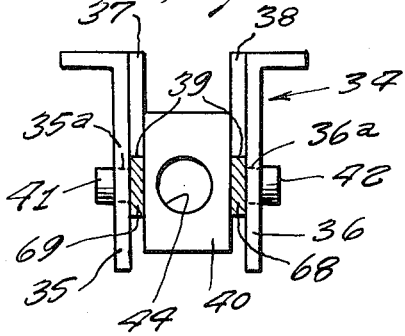
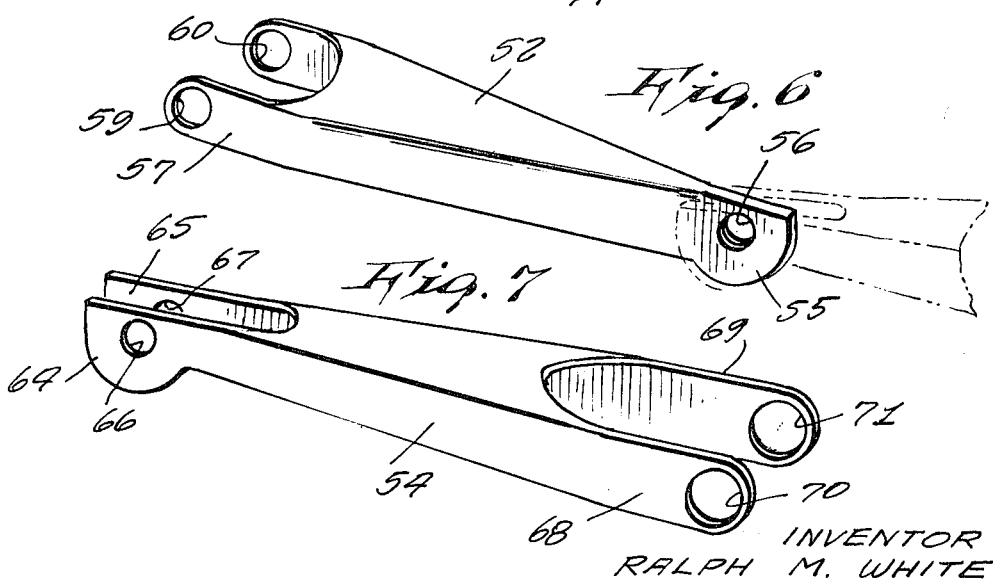
INVENTOR
RALPH M. WHITE United States Patent Office 3,429,196
Patented Feb. 25, 1969

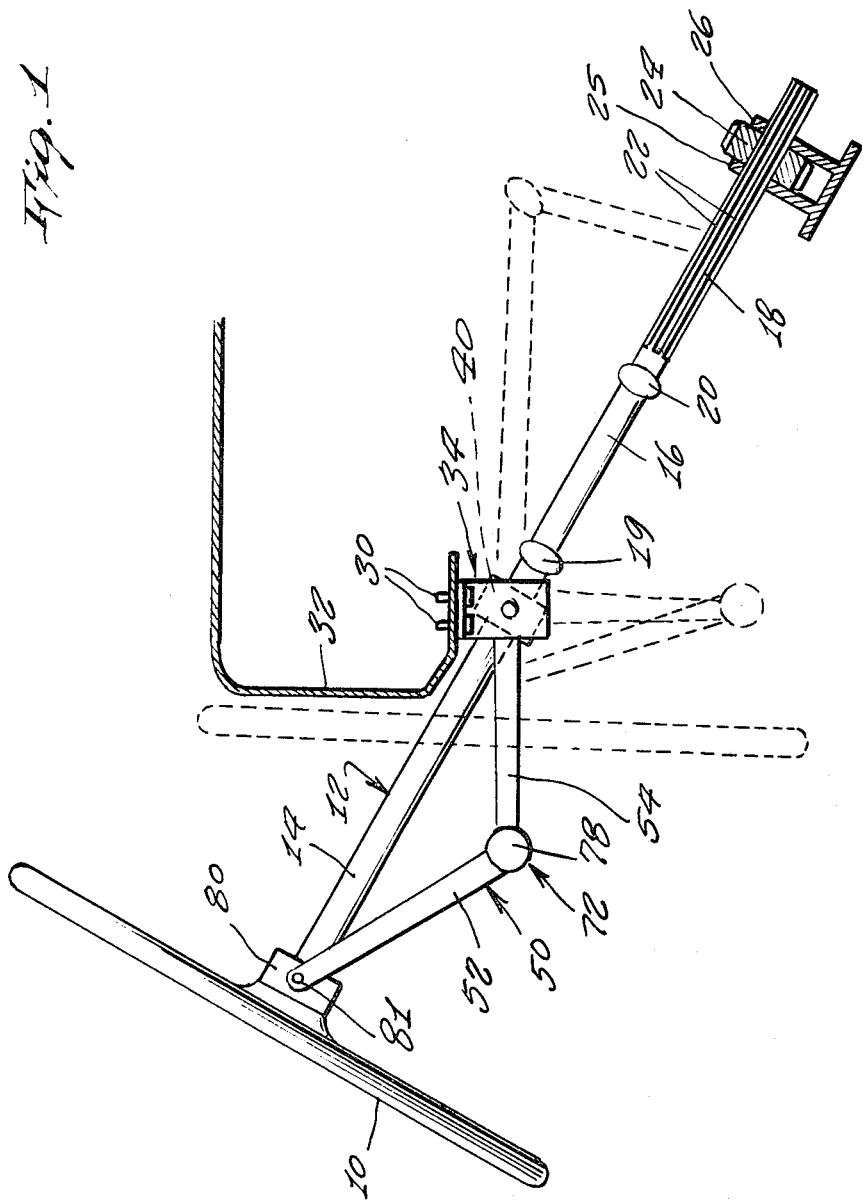

3,429,196
AUTOMOBILE SAFETY STEERING
Ralph M. White, 92 Atlee Drive,
Rochester, N.Y. 14626
Filed Apr. 3, 1967, Ser. No. 627,748
U.S. Cl. 74—493
Int. Cl. B62d 1/18
7 Claims

ABSTRACT OF THE DISCLOSURE

An adjustable steering wheel and column that is both adjustable to a desired position for proper driving comfort and which will simultaneously swing downward and forwardly under impact of the driver in the event of a collision. The steering column includes a rear section, a forward section and an intermediate section connected by universal joints to the adjacent ends of the rear and forward sections. A fixed bracket on the dashboard carries a pivotal bearing block through which the rear steering column section slidably extends. A pair of arms forming a toggle linkage are pivotally connected together at adjacent ends by a friction shock absorbing joint with the other end of one arm pivotally connected to the fixed bracket and the other end of the other arm pivotally connected to a bearing collar on the rear steering column section adjacent to the steering wheel. Limit stops on the fixed bracket engageable with the end of the arm connected thereto limit the extent of opening of the toggle linkage. The friction joint will hold the toggle arms at any desired angular relationship to accommodate adjustment of the steering wheel at any desired position and under impact will yield to permit movement of the steering wheel and column forwardly towards the dashboard.

---

This invention relates to an automotive vehicle steering apparatus.

It is well established that present day automotive safety requirements compel the steering column of the automobile to be collapsible so that in the event of a collision the driver will not be killed or seriously injured by impact with the steering wheel and associated steering assembly.

It is accordingly the primary object of this invention to provide a depressible steering wheel and column that will bodily move forwardly with relation to the automobile dashboard beneath the impact of the driver's body should a collision occur.

Another object of this invention is to disclose a steering wheel and column that is held in its normal operating position by a toggle linkage including an adjustable friction joint which linkage will collapse under impact against the frictional resistance of the friction joint when a collision occurs to cause the steering wheel and column to move bodily forwardly.

A still further object of this invention to provide spaced bearing means for the steering column to which the toggle arms are pivotally connected with one of the bearing means pivotally mounted on a stationary part of the vehicle and providing both a downward swinging movement of the steering column as well as an axial movement of the steering column therethrough.

Yet another object of this invention is to provide in the steering column forwardly of its supporting pivotal bearing means an intermediate column section having a universal joint connection at each of its ends with the adjacent ends of the adjacent column sections.

A further object of this invention is to so relate the toggle links and friction joint as to lie vertically beneath the steering column between the supporting pivotal bearing means and the steering wheel and wholly within the steering wheel in order not to extend below the lowest section of the steering wheel so as not to interfere with the comfort of the driver or the operation of steering.

Further objects of the invention will appear as the description proceeds.

To the accomplishment of the above and related objects, my invention may be embodied in the form illustrated in the accompanying drawings.

Referring to the drawings.

FIGURE 1 is a side elevational view of the steering wheel, column and associated toggle linkage constructoin shown diagrammatically with the dotted lines showing the position of the parts under impact.

FIGURE 2 is a partial side elevational view of the toggle linkage and friction joint.

FIGURE 3 is a sectional view taken on line 3—3, FIGURE 2.

FIGURE 4 is a side view of the steering column support bracket and toggle link connection.

FIGURE 5 is a sectional view taken on line 5—5, FIGURE 4.

FIGURES 6 and 7 are perspective views of the toggle links.

As seen in FIGURE 1, the steering mechanism embodying my invention comprises a steering wheel 10 conventionally mounted on the upper end of a steering column 12. The steering column 12 is formed of an upper section 14, an intermediate section 16 and a lower section 18. A universal joint 19 connects the upper end of intermediate section 16 to the adjacent end of upper section 14, and a like univresal joint 20 connects the lower end of intermediate section 16 to the adjacent end of lower section 18. The lower section 18 is splined as at 22 for sliding engagement in a complementally splined gear 24 supported between the arms 25, 26 of a bracket 28. Operatively connected to gear 24 is the front wheel steering structure (not shown).

Suitably fixedly mounted as by bolts 30 on the vehicle frame beneath the dashboard 32 is a support bracket 34 for the steering column 12. The support bracket 34 is seen to consist of parallel bracket arms 35, 36 having respectviely co-axial openings 35a and 36a. Stop plates 37, 38 are respectively secured to the inside faces of the bracket arms 35, 36 each stop plate providing a shoulder 39 located a like distance above the openings 35a and 36a, see FIGURE 5.

A pivoting bearing block 40 is provided with a pair of oppositely extending co-axial trunnions 41, 42 integral therewith and is positioned between the bracket arms 35, 36 with the trunnion 41 journaled in opening 35a and the trunnion 42 journaled in opening 36a. The sides of the bearing block 40 are seen to engage the inside faces of the stop plates 37, 38 to prevent lateral movement of the bearing block in the bracket 34. Provided in the bearing block 40 is a bore 44 having its axis normal to the axis of the trunnions and mounted within the bore 44 for axial sliding movement therein is the upper section 14 of steering column 12.

Extending between steering wheel 10 and support bracket 34 and located beneath the steering column is a stabilizing toggle linkage 50 comprising a rear toggle arm 52 and a forward toggle arm 54. The stabilizing toggle arms 52, 54 shown separately in FIGURES 6 and 7 are of one piece construction preferably stamped from ⅛ inch 1045 sheet steel. The rear arm 52, FIGURE 6, is seen to be of inverted channel form and of elongated triangular shape presenting at its forward end 55 a connecting portion of double thickness provided with a transverse opening 56 and at its rear end with a pair of laterally spaced parallel arms 57, 58 respectively provided with co-axial openings 59, 60. The forward arm 54, FIGURE 7, is of similar elongated triangular shape and of inverted channel form having at its rear end a pair of laterally spaced parallel arms 64, 65 provided with co-axial openings 66, 67; the arms 64, 65 being spaced apart a distance greater than the double thickness of rear arm end 55 which is adapted to fit therebetween for a purpose as will be hereinafter described. At its forward end the arm 54 is provided with a pair of laterally spaced parallel arms 68, 69 having co-axial openings 70, 71.

The stabilizing toggle arms 52, 54 are connected together by a friction joint connection 72 comprising placement of end 55 of toggle arm 52 between arms 64, 65 of toggle arm 54, there being disposed between each side face of end 55 and the respective inside faces of arms 64, 65 a disc 74 of suitable friction material. A bolt 76 extends through the arm end openings 66, 56, 67 and through openings (not shown) in the friction discs 74, 74, there being an internally threaded knurled knob 78 on the terminal end of the bolt 76 for holding the connected ends of the toggle arms in assembled relation as well as providing a manual adjustment of the pressure applied on the friction discs. It is to be noted that the arm ends 64, 65 of toggle arm 54 are of substantial length such that each arm end possesses a degree of flexibility that will permit desired pressure application on the friction discs by the adjustment of the knob 78.

Surrounding the upper column section 14 is a bearing collar 80 which is straddled by arm ends 57, 58 of rear toggle arm 52. Pivot pins or bolts 81 extend through corresponding openings 59, 60 of arm ends 57, 58 into collar 80 for pivotally connecting the toggle arm 52 thereto. The arm ends 68, 69 of toggle arm 54 straddle bearing block 40, see FIGURE 5, and are pivotally supported on trunnions 41, 42. It is to be noted that the length of the toggle arms 52, 54 is such as to place each at an inclination to the axis of the steering column 12 with the friction joint connection of the toggle arms lying within the confines or radius of the steering wheel 10 so as not to interfere with the comfort and operative movements of the driver. By virtue of the friction joint connection 72, the toggle arms 52, 54 are held in their normal angular relationship such that bearing collar 80 is always at the upper end of steering column 12 and against the underside of steering wheel 10. Turning of the steering wheel 10 will impart a rotational movement of the upper steering column section 14 in the bearing collar 80 and the bearing block 40 with the toggle linkage 50 always positioned beneath the same.

The friction joint 72 is adjustable to compensate for different conditions and to allow driving at the most convenient position of the steering wheel for the driver. FIGURE 1 shows the steering apparatus (solid lines) in its normal driving position. The steering apparatus will operate properly in all positions from the toggle linkage fully open to totally collapsed. By adjustment of the front seat and the steeering wheel the driver should be able to find the most comfortable position for driving.

In the fully open position of the toggle linkage 50 as shown in FIGURE 1, the upper edges of arm ends 68, 69 of toggle arm 54 will respectively engage the shoulders 39 of stop plates 37, 38. The shoulders 39 thus act as limit stops to limit further opening of the toggle linkage 50 and to thus establish the outermost position of the steering wheel 10 from the dashboard 32.

Should the vehicle collide with another vehicle or stationary object the impact of the driver on the steering wheel 10 will cause the same and steering column section 14 (see FIGURE 1) to move axially forwardly through the bearing block 40 accompanied at the same time by a downward swinging movement thereof by virtue of the collapse of the toggle linkage 50 and pivoting of the bearing block 40 in support bracket 34. The combined swinging and axial movement of steering column section 14 is accommodated by the universal joints 19 and 20 and intermediate column section 16, the sections 14 and 16 assuming (see dotted line showing in FIGURE 1) different angular relationships to the splined column section 18. The force of the impact will obviously cause the friction joint 72 to release so as to permit collapse of the toggle linkage. The friction joint 72 acts as a shock absorber to cushion or break the impact shock and the degree of collapse of the toggle linkage is dependent only as long as the force exerted by the driver on the wheel exceeds the frictional force exerted by the friction joint.

The steering column section 14 and toggle linkage may be covered by a flexible accordion-type sleeve of polyethylene plastic or other suitable material which is durable, flexible and inexpensive.

If desired the friction joint 72 may serve as a pivot joint for the toggle arms without any shock absorbing friction, there being provided in the steering apparatus a pneumatic or hydraulic shock absorber associated with the steering column section 14.

The novel features and the operation of this device will be apparent from the foregoing description. While the device has been shown and the structure described in detail, it is obvious that this is not to be considered limited to the exact form disclosed, and that changes may be made therein within the scope and the spirit of the invention.

Having thus set forth and disclosed the nature of this invention, what is claimed is:

1. A steering wheel and steering column construction for a motor vehicle having a dashboard structure and a front wheel steering operating means comprising:
   (a) a steering wheel,
   (b) a stering column including a rear column section, a forward column section and in intermediate column section flexibly connected at its ends to adjacent ends of said rear and forward column sections,
   (c) said steering wheel connected to said rear column section,
   (d) a bracket fixedly secured to said dashboard structure,
   (e) a bearing block pivotally mounted on said bracket through which said rear column section extends for axial sliding movement,
   (f) a bearing collar on said rear column section adjacent to said steering wheel,
   (g) a toggle linkage embodying a pair of toggle arms having an outer end of one arm pivoted to said bearing collar and an outer end of the other arm pivoted to said bracket, and
   (h) a friction pivot joint connecting the inner ends of said toggle arms to each other whereby to hold said rear steering column section and steering wheel in a selected adjusted position relative to said dashboard and in the event of a collision impact on the steering wheel will cause a simultaneous downward swinging and axial movement of the rear steering column section forwardly relative to said dashboard.

2. The steering wheel and steering column construction of claim 1, wherein said bracket comprises:
   (a) a pair of bracket arms,
   (b) said bearing block including co-axially laterally spaced trunnions,
   (c) said bearing block disposed between said bracket arms with a trunnion journaled in an adjacent bracket arm,
   (d) the outer end of said one toggle arm having a pair of parallel arm ends journaled on said trunnions,
   (e) the outer end of said other toggle arm having a pair of parallel arm ends straddling said bearing collar, and
   (f) a pivot member pivotally connecting each arm end to said bearing collar.

3. The steering wheel and steering column construction of claim 2, including:
  (a) a limit stop on at least one bracket arm, and
  (b) at least one outer arm end of said one toggle arm engageable with said limit stop whereby to limit the extent to which the toggle linkage may be opened to thereby limit the outward position of the steering which is relative to said dashboard.

4. The steering wheel and steering column construction of claim 3, wherein said friction pivot joint comprises:
  (a) a pair of laterally spaced arm ends on the inner end of said one toggle arm,
  (b) a single arm end on the inner end of said other toggle arm positioned between the spaced inner arm ends of said one toggle arm,
  (c) a friction disc positioned between each side of said single arm end and the opposed face of an adjacent inner arm end of said one toggle arm, and
  (d) manually adjustable means extending through said arm ends and said friction discs providing the pivotal connection between the inner ends of said toggle arms.

5. The steering wheel and steering column construction of claim 4, wheerin said manually adjustable means comprises:
  (a) a bolt extending through co-axial openings in said inner arm ends and said friction discs, and
  (b) a manually adjustable internally threaded knob on the terminal end of said bolt providing an adjustable pressure engagement of said pair of laterally spaced inner arm ends of said one toggle arm on said friction discs and on the faces of said single arm end of said other toggle arm therebetween.

6. The steering wheel and steering column construction of claim 5, wherein:
  (a) said forward steering column section has axial movement along a fixed axis,
  (b) means adapted to connect said forward steering column section to said front wheel steering operating means, and
  (c) a universal joint connecting each end of said intermediate steering column section to a corresponding adjacent end of said rear and forward steering column sections.

7. The steering wheel and steering column construction of claim 6, wherein:
  (a) said toggle arms are dimensioned such that in the maximum open position of the toggle linkage as limited by said limit stop the friction pivot joint thereof will lie within the radius of said steering wheel, and
  (b) said toggle linkage being located beneath said rear steering column section.

References Cited
UNITED STATES PATENTS

| | | | |
|---|---|---|---|
| 2,937,881 | 5/1960 | Norrie | 74—493 X |
| 2,988,931 | 6/1961 | Markley et al. | 74—493 X |
| 3,329,040 | 7/1967 | Stein | 74—493 |

MILTON KAUFMAN, *Primary Examiner.*